United States Patent
Khanfar et al.

(10) Patent No.: US 9,506,497 B2
(45) Date of Patent: Nov. 29, 2016

(54) LIGHTWEIGHT DRIVE AXLE SHAFT

(71) Applicant: U.S. Manufacturing Corporation, Warren, MI (US)

(72) Inventors: Adel Mohd Khanfar, Sterling Heights, MI (US); Brian Anthony Simon, Bloomfield Hills, MI (US)

(73) Assignee: U.S. MANUFACTURING CORPORATION, Sterling Heights, MI (US)

( * ) Notice: Subject to any disclaimer, the term of this patent is extended or adjusted under 35 U.S.C. 154(b) by 15 days.

(21) Appl. No.: 14/247,702

(22) Filed: Apr. 8, 2014

(65) Prior Publication Data

US 2015/0285295 A1 Oct. 8, 2015

(51) Int. Cl.
  *F16D 1/06* (2006.01)
  *F16C 3/02* (2006.01)
  *B60K 17/16* (2006.01)

(52) U.S. Cl.
  CPC .............. *F16C 3/02* (2013.01); *B60K 17/165* (2013.01)

(58) Field of Classification Search
  CPC ........ F16B 35/06; F16B 35/048; F16C 3/02; B60K 17/165
  USPC ...... 464/182; 301/126, 137, 124.1; 411/399; 403/359.5, 408.1; 475/331
  See application file for complete search history.

(56) References Cited

U.S. PATENT DOCUMENTS

| | | | | |
|---|---|---|---|---|
| 1,822,093 A | * | 9/1931 | Hendrickson | B60B 27/065 |
| 2,543,811 A | * | 3/1951 | Snow | B60K 17/046 |
| 2,649,922 A | * | 8/1953 | Hutchinson | B60T 11/043 |
| 2,876,573 A | * | 3/1959 | Schmidt | 464/182 X |
| 3,836,272 A | * | 9/1974 | Duer | F16D 1/09 |
| | | | | 403/359.5 |
| 3,845,622 A | * | 11/1974 | Hufstader | F16D 1/06 |
| | | | | 464/182 X |
| 4,551,115 A | * | 11/1985 | Ferguson | F16D 3/12 |
| 4,768,839 A | * | 9/1988 | Spindler | B23K 20/129 |
| | | | | 301/124.1 |
| 5,205,464 A | | 4/1993 | Simon | |
| 5,213,250 A | | 5/1993 | Simon | |

(Continued)

FOREIGN PATENT DOCUMENTS

| | | | |
|---|---|---|---|
| GB | 2 319 584 A | * | 5/1998 |
| WO | WO 2005/097520 | | 10/2005 |
| WO | WO 2013/116892 | | 8/2013 |

OTHER PUBLICATIONS

EP Search Opinion and Search Report dated Aug. 18, 2015 regarding Application No. EP15162839.

(Continued)

*Primary Examiner* — Gregory Binda
(74) *Attorney, Agent, or Firm* — Foley & Lardner LLP

(57) ABSTRACT

A lightweight drive axle includes an elongate, tubular body having a first longitudinal end configured for coupling to a side gear in a differential and a second longitudinal end configured to support a vehicle wheel. The shaft further includes a screw disposed at the first longitudinal end of the body. The screw comprise a shank configured to be received within a bore in the body and a head having first and second portions. The first portion is disposed at one longitudinal end of the screw, has a first diameter and is spaced from the first longitudinal end of the body. The second portion is disposed between the first portion and the shank and has a second diameter less than the first diameter such that the first longitudinal end of the body and the first and second portions of the head define a groove configured to receive a shaft retainer.

21 Claims, 2 Drawing Sheets

(56) References Cited

U.S. PATENT DOCUMENTS

| | | | |
|---|---|---|---|
| 6,059,378 A | 5/2000 | Dougherty et al. | |
| 6,083,108 A | 7/2000 | Grubish | |
| 6,530,859 B2* | 3/2003 | Boston | F16C 21/00 475/331 X |
| 6,557,947 B1 | 5/2003 | Hunt | |
| 6,572,199 B1 | 6/2003 | Creek et al. | |
| 6,752,560 B2* | 6/2004 | Wilson et al. | 464/182 X |
| 2002/0198075 A1 | 12/2002 | Prucher | |
| 2010/0244546 A1 | 9/2010 | Milio et al. | |
| 2010/0272504 A1* | 10/2010 | Sheth et al. | |
| 2013/0020855 A1* | 1/2013 | Becker | B60B 3/165 |
| 2013/0207446 A1* | 8/2013 | Marro | B60K 7/0007 |

OTHER PUBLICATIONS

International Search Report dated Jun. 29, 2015 for PCT/US2015/024135, 3 pages.

Written Opinion of the International Search Authority dated Jun. 3, 2015 for PCT/US2015/024135, 5 pages.

* cited by examiner

LIGHTWEIGHT DRIVE AXLE SHAFT

BACKGROUND OF THE INVENTION a. Field of the Invention

This invention relates to drive axles. In particular, the invention relates to a drive axle shaft that is both lightweight and capable of use in a semi-floating axle.

b. Background Art

Vehicle drive axle shafts are subjected to significant loads. The shafts transmit significant torque to the vehicle wheels and are subject to rapid starts and stops in operation. In semi-floating axles, the drive shafts also support a portion of the vehicle weight. Because of the significant loads imposed on the shafts, most shafts are formed of solid metal to provide sufficient rigidity and strength. Solid drive axle shafts, however, add significant weight to the vehicle. This weight has a negative effect on fuel economy and imposes additional loads on other vehicle components. Further, solid drive axle shafts incur significant material costs.

Because of the disadvantages associated with solid drive axle shafts, hollow drive axle shafts have been developed as shown, for example, in U.S. Pat. No. 5,213,250, the entire disclosure of which is incorporated herein by reference. Hollow shafts, however, generally cannot be used in semi-floating axles. In a typical semi-floating axle, the inboard end of the drive axle shaft is splined or keyed to a side gear of a vehicle differential. In order to prevent movement of the shaft in an outboard direction, a semi-circular retaining clip or "C-clip" is disposed on an inboard side of the side gear and disposed within a machined groove formed in the outer surface of the drive axle shaft. The dimensions of a hollow drive axle shaft (i.e., the distance between the outer and inner diameters of the shaft) generally make it difficult or impossible to machine the groove thereby limiting or preventing the use of hollow drive axle shafts in semi-floating axle applications.

The inventor herein has recognized a need for a drive axle shaft that will minimize and/or eliminate one or more of the above-identified deficiencies.

BRIEF SUMMARY OF THE INVENTION

This invention relates to drive axles. In particular, the invention relates to a drive axle shaft that is both lightweight and capable of use in a semi-floating axle.

A drive axle shaft in accordance with one embodiment of the invention includes an elongate, tubular body having a first longitudinal end configured for coupling to a side gear in a differential and a second longitudinal end configured to support a vehicle wheel. The drive axle shaft further includes a screw disposed at the first longitudinal end of the tubular body. The screw comprises a shank configured to be received within a bore in the tubular body. The screw further comprises a head having first and second portions. The first portion is disposed at one longitudinal end of the screw and has a first diameter. The first portion is spaced from the first longitudinal end of the tubular body. The second portion is disposed between the first portion and the shank and has a second diameter less than the first diameter such that the first longitudinal end of the tubular body and the first and second portions of the head define a groove configured to receive a shaft retainer.

A drive axle shaft in accordance with the present invention represents an improvement relative to conventional drive axle shafts. Because the drive axle shaft is hollow, the shaft weighs less than conventional shafts—thereby improving vehicle fuel economy and reducing loads on other vehicle components—and requires less material. Further, the use of the screw to form a groove for the shaft retainer enables the drive axle shaft to be used in semi-floating axle applications unlike conventional hollow shafts.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
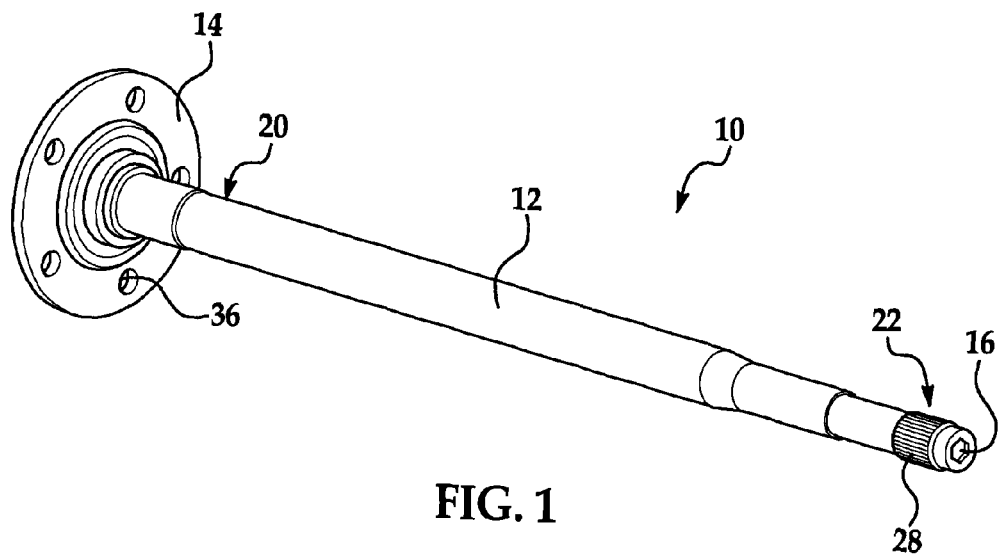
FIG. 1 is a perspective view of a drive axle shaft in accordance with one embodiment of the present invention.
Figure 2:
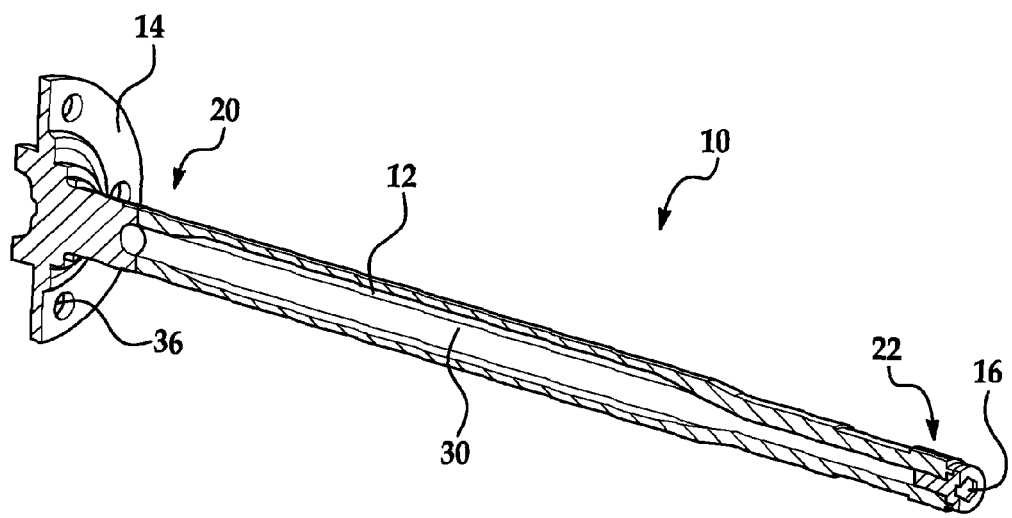
FIG. 2 is a cross-sectional view of the drive axle shaft of FIG. 1.

Referring now to the drawings wherein like reference numerals are used to identify identical components in the various views, FIGS. 1-2 illustrate a drive axle shaft 10 in accordance with one embodiment of the present invention. Shaft 10 is particularly adapted for use in a vehicle drive axle. It should be understood, however, that shaft 10 may be used on a wide variety of vehicles and in non-vehicular applications. Shaft 10 may include a body 12, a wheel flange 14 and a screw 16.

Figure 3:
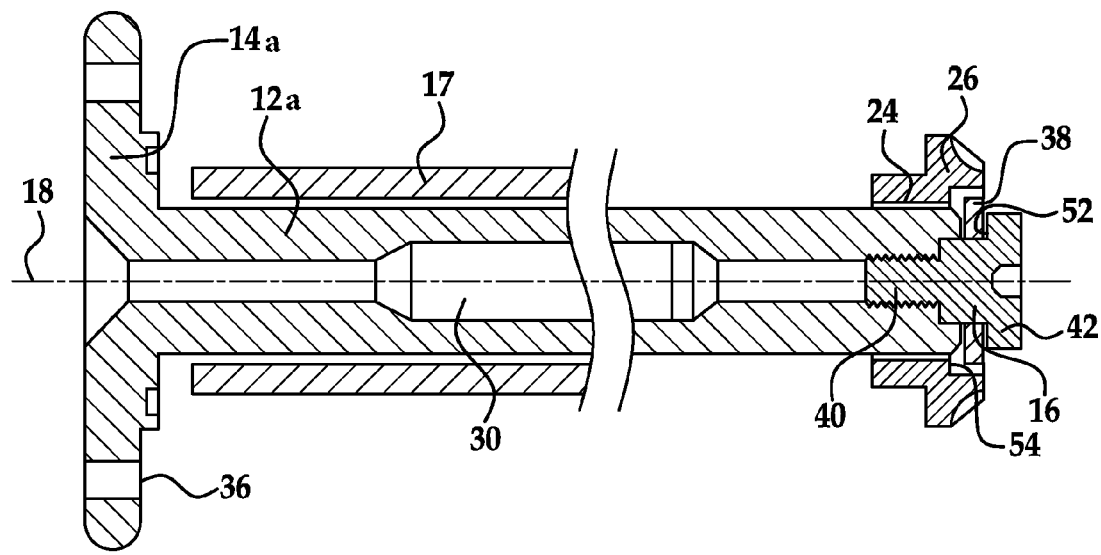
FIG. 3 is a cross-sectional view of a portion of drive axle assembly incorporating the drive axle shaft of FIGS. 1-2.
Figure 4:
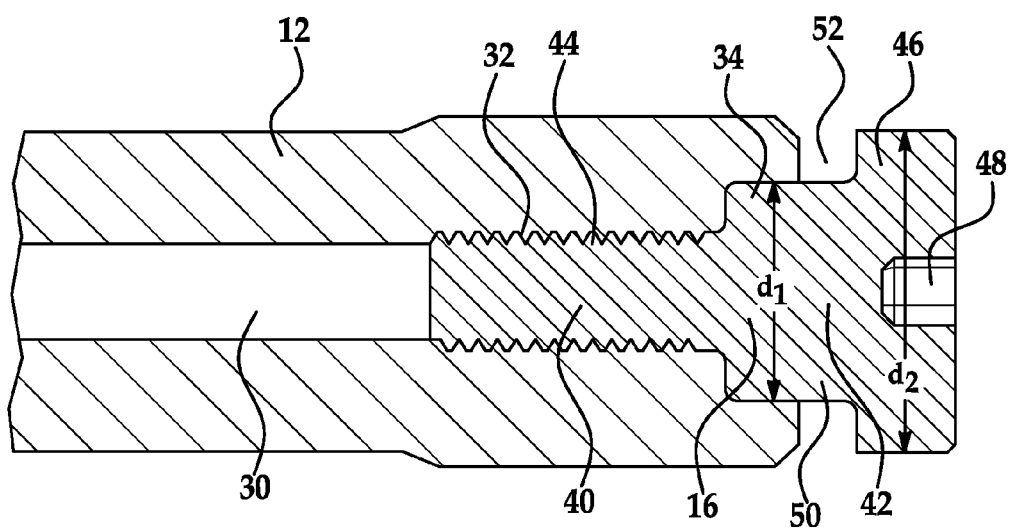
FIG. 4 is a cross-sectional view of a portion of the drive axle shaft of FIGS. 1-2.

Body 12 may be used to transfer torque between a drive member and a driven member such as from a vehicle drivetrain (not shown) to one or more vehicle wheels (not shown). Body 12 may be made from conventional metals and metal alloys and may be formed by extruding a tubular blank through a die using a series of punches and mandrels of varying diameter as described in greater detail in U.S. Pat. No. 5,213,250, the entire disclosure of which is incorporated herein by reference. Referring to FIG. 3, body 12 may be partially disposed within an axle tube 17 or housing of a vehicle drive axle assembly and supported therein by one or more sets of bearings (not shown). Body 12 is elongate and is disposed about, and may be centered about, a rotational axis 18. One longitudinal end 20 of body 12 extends outward from tube 17 and may be configured to support a vehicle wheel. The other longitudinal end 22 of body 12 may extend through a bore 24 of a side gear 26 in a differential. Referring again to FIG. 1, the radially outer surface of end 22 may define a plurality of axially extending splines 28 configured to engage corresponding splines in bore 24 of side gear 26 in order to couple shaft 10 for rotation with side gear 26. The splines may be formed by, for example, rolling or swaging. Referring to FIG. 2, in accordance with one aspect of the invention, body 12 is tubular or hollow in order to reduce the weight of axle shaft 10 relative to conventional solid drive axle shafts and defines a bore 30 extending along a portion or all of the length of body 12. The outer diameter of body 12 may be uniform while the inner diameter of body 12 may vary along the length of body 12 to define a wall of varying thickness (and a bore 30 of varying diameter) in order to accommodate variations in loads along the length of body 12. In the illustrated embodiment, for example, the inner diameter of body 12 is reduced proximate each longitudinal end 20, 22 where body 12 is subject to increased loads through its connection to the vehicle wheel and side gear 26, respectively. It should be understood that the particular variations in the inner diameter of body 12 shown in the drawings are illustrative only and that the actual thickness of the wall (and diameter of bore 30) will vary depending on the needs of the application. Further, it should be understood that the thickness in the wall can be varied by varying either or both of the inner and outer diameters of the body 12. Referring to FIG. 4, at end 22 of body 12, body 12 may define an internal thread 32 and bore 30 may open up into a counterbore 34 for a purpose described hereinbelow.

Referring again to FIGS. 1-2, wheel flange 14 is provided to support a driven member such as a vehicle wheel and to couple the driven member to axle shaft 10 for rotation therewith. Flange 14 may be made from conventional metals and metal alloys. Flange 14 may comprise a separate forged component that is spun weld to body 12 as described in U.S. Pat. No. 5,213,250. Alternatively, as shown in FIG. 3, a flange 14a and a body 12a may comprise a unitary or one-piece structure formed from the same tubular blank with flange 14a formed after extrusion of the tubular blank referenced above. Flange 14, 14a may be annular in shape and may include a plurality of bores 36 extending parallel to axis 18 and configured to receive bolts (not shown) used to support the vehicle wheel.

Referring now to FIG. 3, screw 16 works in combination with a shaft retainer 38 to inhibit axial movement of shaft 10 relative to side gear 26. In particular, screw 16 and shaft retainer 38 prevent outboard movement of shaft 10 relative to side gear 26 (inboard movement being restricted by other components of the differential such as the cross pin (not shown)). Screw 16 may be made from conventional metals and metal alloys. Screw 16 includes a shank 40 and a head 42.

Shank 40 is configured to be received within bore 30 in body 12. The outer diameter of shank 40 is about equal to the inner diameter of bore 30 at end 22 of body 12. Referring to FIG. 4, shank 40 may define an external thread 44 configured to engage the internal thread 32 in bore 30.

Head 42 extends outwardly from shank 40 and body 12. One portion 46 of head 42 is disposed at one longitudinal end of screw 16 opposite shank 40. Portion 46 has a diameter $d_1$ and is spaced from end 22 of body 12. Portion 46 may define a socket 48 having a plurality of straight sides (e.g., a hex socket having six sides) configured to receive a tool for rotating screw 16. Another portion 50 of head 42 is disposed between portion 46 and shank 40 and has a diameter $d_2$ that is less than the diameter $d_1$ of portion 46. Upon insertion of screw 16 into body 12, end 22 of body 12 and portions 46, 50 of head 42 of screw 16 define an annular groove 52 configured to receive retainer 38. Retainer 38 may comprise a conventional slotted washer or "C-clip" retainer having a width and inner diameter configured to be received within groove 52 and an outer diameter that is greater than the diameter of bore 24 in side gear 26 and configured to be received within a recess 54 on an inboard side of gear 26 so as to prevent shaft 10 from being pulled through side gear 26 in an outboard direction along axis 18. It should be understood, however, that retainer 38 may assume a variety of forms conventional in the art.

A drive axle shaft 10 in accordance with the present invention represent an improvement relative to conventional drive axle shafts. Because the drive axle shaft 10 is hollow, the shaft 10 weighs less than conventional shafts—thereby improving vehicle fuel economy and reducing loads on other vehicle components—and requires less material. Further, the use of the screw 16 to form a groove 52 for the shaft retainer 38 enables the drive axle shaft 10 to be used in semi-floating axle applications unlike conventional hollow shafts.

While the invention has been shown and described with reference to one or more particular embodiments thereof, it will be understood by those of skill in the art that various changes and modifications can be made without departing from the spirit and scope of the invention.

What is claimed is:

1. A drive axle shaft, comprising:
    an elongate, tubular body having a first longitudinal end configured for coupling to a side gear in a differential and a second longitudinal end configured to support a vehicle wheel;
    a screw disposed at said first longitudinal end of said tubular body, said screw comprising:
        a shank configured to be received within a bore in said tubular body; and
        a head having first and second portions, said first portion disposed at one longitudinal end of said screw and having a first diameter, said first portion spaced from said first longitudinal end of said tubular body, said second portion disposed between said first portion and said shank and having a second diameter less than said first diameter such that said first longitudinal end of said tubular body and said first and second portions of said head define a groove; and
    a shaft retainer removably received in the groove;
    wherein said tubular body is hollow and defines a bore extending substantially from said first longitudinal end to said second longitudinal end; and
    wherein a diameter of said bore varies along said body.

2. The drive axle shaft of claim 1 further comprising a wheel flange disposed at said second longitudinal end of said tubular body.

3. The drive axle shaft of claim 1 wherein said tubular body defines an internal thread configured to engage an external thread on said shank of said screw.

4. The drive axle shaft of claim 1 wherein said tubular body defines a counterbore at said first longitudinal end configured to receive said second portion of said head.

5. The drive axle shaft of claim 1 wherein said head defines a socket having a plurality of straight sides.

6. The drive axle shaft of claim 1 wherein said first longitudinal end is coupled to said side gear.

7. The drive axle shaft of claim 1 wherein said tubular body has cylindrical exterior defining a body diameter at said first longitudinal end; and said shaft retainer defines a shaft retainer diameter greater than said body diameter.

8. The drive axle shaft of claim 1 wherein said diameter of said bore is reduced proximate to said first and second longitudinal ends.

9. A drive axle shaft, comprising:
    an elongate, tubular body having a first longitudinal end configured for coupling to a side gear in a differential and a second longitudinal end;
    a wheel flange disposed at said second longitudinal end of said tubular body, the wheel flange configured to support a vehicle wheel;
    a screw disposed at said first longitudinal end of said tubular body, said screw comprising:
        a shank configured to be received within a bore in said tubular body; and
        a head having first and second portions, said first portion disposed at one longitudinal end of said screw and having a first diameter, said first portion spaced from said first longitudinal end of said tubular body, said second portion disposed between said first portion and said shank and having a second diameter less than said first diameter such that said first longitudinal end of said tubular body and said first and second portions of said head define a groove configured to receive a shaft retainer; and wherein the shaft retainer is removably received in the groove; and wherein said bore has a reduced diameter proximate to said first and second longitudinal ends.

10. The drive axle shaft of claim 9 wherein said tubular body defines an internal thread configured to engage an external thread on said shank of said screw.

11. The drive axle shaft of claim 9 wherein said tubular body defines a counterbore at said first longitudinal end configured to receive said second portion of said head.

12. The drive axle shaft of claim 9 wherein said head defines a socket having a plurality of straight sides.

13. The drive axle shaft of claim 9 further comprising said side gear.

14. The drive axle shaft of claim 9 wherein said tubular body is hollow and defines a bore extending substantially from said first longitudinal end to said second longitudinal end.

15. The drive axle shaft of claim 9 wherein said diameter of said bore varies along said body.

16. A drive axle shaft, comprising:
a body comprising at least a first and a second end;
said first end comprising a threaded bore; and
a screw disposed at said first end, said screw comprising:
a threaded shank, wherein said threaded shank engages said threaded bore, and a head, said head projecting from said threaded shank;
a shaft retainer, removably coupled to said body;
a splined length between said first and second ends; and
a side gear comprising a splined bore;
wherein said splined bore engages said splined length;
wherein said body is hollow and defines a bore extending substantially from said first end to said second end; and
wherein a diameter of said bore varies along said body.

17. The drive axle shaft of claim 16 wherein said shaft retainer is removably coupled to a side gear.

18. The drive axle shaft of claim 16 wherein said shaft retainer is removably coupled to said screw.

19. The drive axle shaft of claim 16 wherein a groove is defined by said head and said body.

20. The drive axle shaft of claim 16 further comprising a wheel flange disposed at said second end.

21. The drive axle shaft of claim 16 wherein said diameter of said bore is reduced proximate to said first and second ends.

* * * * *